(12) United States Patent
Hosoda et al.

(10) Patent No.: US 12,383,852 B2
(45) Date of Patent: Aug. 12, 2025

(54) HONEYCOMB STRUCTURE AND EXHAUST GAS PURIFYING DEVICE

(71) Applicant: NGK Insulators, Ltd., Nagoya (JP)

(72) Inventors: Kazuya Hosoda, Toyoake (JP); Takafumi Kimata, Nagoya (JP); Yunie Izumi, Nisshin (JP)

(73) Assignee: NGK INSULATORS, LTD., Nagoya (JP)

( * ) Notice: Subject to any disclaimer, the term of this patent is extended or adjusted under 35 U.S.C. 154(b) by 267 days.

(21) Appl. No.: 17/810,874

(22) Filed: Jul. 6, 2022

(65) Prior Publication Data
US 2022/0362704 A1  Nov. 17, 2022

Related U.S. Application Data

(63) Continuation of application No. PCT/JP2021/004680, filed on Feb. 8, 2021.

(30) Foreign Application Priority Data

Feb. 7, 2020  (JP) ................................ 2020-020108

(51) Int. Cl.
*F01N 3/027* (2006.01)
*B01D 46/24* (2006.01)
*F01N 3/022* (2006.01)

(52) U.S. Cl.
CPC ... *B01D 46/2429* (2013.01); *B01D 46/24491* (2021.08); *B01D 46/24494* (2021.08);
(Continued)

(58) Field of Classification Search
None
See application file for complete search history.

(56) References Cited

U.S. PATENT DOCUMENTS

2016/0363022 A1  12/2016  Hoki et al.
2017/0014763 A1  1/2017  Crawford et al.
(Continued)

FOREIGN PATENT DOCUMENTS

DE  11 2020 000 312 T5  9/2021
JP  H11-336534 A  12/1999
(Continued)

OTHER PUBLICATIONS

Tresoldi Metalli srl, "Stainless Steel", 2020, p. 18-19; Accessed at https://www.tresoldimetalli.it/wp-content/uploads/2020/12/Tresoldi Metalli_Acciaio-Inox_EN_DE.pdf.*
(Continued)

*Primary Examiner* — Humera N. Sheikh
*Assistant Examiner* — Julia L Rummel
(74) *Attorney, Agent, or Firm* — BURR PATENT LAW, PLLC (57) ABSTRACT

A pillar shaped honeycomb structure includes: an outer peripheral wall; and porous partition walls disposed on an inner side of the outer peripheral wall, the partition walls defining a plurality of cells, each of the cells extending from one end face to other end face to form a flow path, wherein the cells include a plurality of wire pieces made of a magnetic substance, the wire pieces being provided apart from each other via spaces or buffer materials in an extending direction of the cells.

14 Claims, 5 Drawing Sheets

(52) U.S. Cl.
CPC ... *B01D 46/24495* (2021.08); *B01D 46/2476* (2021.08); *F01N 3/0222* (2013.01); *F01N 3/027* (2013.01)

(56) References Cited

U.S. PATENT DOCUMENTS

| | | | |
|---|---|---|---|
| 2017/0022868 A1* | 1/2017 | Crawford | B01D 53/94 |
| 2017/0198620 A1 | 7/2017 | Crawford et al. | |
| 2017/0218823 A1* | 8/2017 | Crawford | F01N 3/2013 |
| 2019/0323401 A1 | 10/2019 | Miyairi et al. | |
| 2021/0346880 A1 | 11/2021 | Miyairi et al. | |

FOREIGN PATENT DOCUMENTS

| | | |
|---|---|---|
| JP | 2017-002785 A | 1/2017 |
| JP | 2019-188272 A | 10/2019 |
| WO | 2016/021186 A1 | 2/2016 |

OTHER PUBLICATIONS

International Search Report and Written Opinion (Application No. PCT/JP2021/004680) dated Mar. 23, 2021 (with English translation).

English translation of International Preliminary Report on Patentability (Chapter I) (Application No. PCT/JP2021/004680) dated Aug. 18, 2022; 5 pages.

AN German Office Action (with English translation) dated Apr. 5, 2023 (Application No. 11 2021 000 439.5).

* cited by examiner

HONEYCOMB STRUCTURE AND EXHAUST GAS PURIFYING DEVICE

FIELD OF THE INVENTION

The present invention relates to a honeycomb structure and an exhaust gas purifying device. More particularly, it relates to a honeycomb structure and an exhaust gas purifying device, which has improved thermal shock resistance and oxidation resistance when the honeycomb structure is subjected to electromagnetic induction heating.

BACKGROUND OF THE INVENTION

Exhaust gases from motor vehicles typically contain harmful components such as carbon monoxide, hydrocarbons and nitrogen oxides and/or fine particles of carbon or the like as a result of incomplete combustion. From the viewpoint of reducing health hazards to a human body, there is an increasing need for reducing harmful gas components and fine particles in exhaust gases from motor vehicles.

However, at present, these harmful components are discharged during a period immediately after an engine is started, i.e., a period during which a catalyst temperature is lower and a catalytic activity is insufficient. Therefore, the harmful components in the exhaust gas may be discharged without being purified by the catalyst before reaching a catalyst activating temperature. In order to satisfy such a need, it is necessary to reduce emission as much as possible, which is discharged without being purified by a catalyst before reaching the catalyst activating temperature. For example, measures using an electric heating technique are known in the art.

As such an art, Patent Literature 1 proposes a technique for inserting a magnetic wire into a part of cells of a cordierite honeycomb widely used as a catalyst supported honeycomb. According to this technique, a current can be passed through the coil on an outer circumference of the honeycomb to increase a wire temperature by electromagnetic induction heating, and its heat can increase a temperature of the honeycomb.

Exhaust carbon fine particles from diesel engines and gasoline engines are affected on human health, so that there is also an increased need for reduction of those fine particles. For such exhaust gas processing, wall-flow type filters of honeycomb structures which are alternately provided with plugged portions are used. The carbon fine particles (soot) collected by the filters are burned out and removed by increasing a temperature of the exhaust gas. However, a longer period of time required for the burning and removal causes a problem that consumption of a fuel required for increasing the temperature of the exhaust gas increases. Further, it is preferable to mount the filter at an underfloor position having a relatively large space from the viewpoint of ensuring a mounting space, in terms of ensuring a degree of freedom in a design for forming an exhaust system. However, if it is placed at the underfloor position, a temperature of an exhaust gas from an engine is decreased, which causes a problem that the carbon fine particles cannot be burn out and removed.

To address this problem, Patent Literature 2 discloses a technique for dispersedly arranging magnetic fine particles on surfaces of partition walls of a filter and heating them by electromagnetic induction heating. Further, Patent Literature 3 discloses a technique for inserting a magnetic wire into plugged portions of a filter.

CITATION LIST

Patent Literatures

[Patent Literature 1] U.S. Patent Application Publication No. 2017/0022868 A1
[Patent Literature 2] WO 2016/021186 A1
[Patent Literature 3] U.S. Patent Application Publication No. 2017/0014763 A1

SUMMARY OF THE INVENTION

However, the thermal expansion coefficient of the metal wire is much higher than that of the honeycomb. Therefore, as disclosed in Patent Literatures 1 and 2, when the metal wire is inserted into and fixed to the cells of the honeycomb and the temperature is increased by electromagnetic induction heating, it causes a problem that stress is generated in plugged portions of the cells of the honeycomb so that the plugged portions are broken.

Further, the present inventors have found that when magnetic particles, rather than the metal wires, are dispersed and arranged on surfaces of partition walls of the filter and heated by electromagnetic induction heating, the surface area of the magnetic particles is larger, so that they may easily be oxidized and heating performance may be deteriorated.

In view of the above circumstances, an object of the present invention is to provide a honeycomb structure and an exhaust gas purifying device, which has improved thermal shock resistance and oxidation resistance when the honeycomb structure is subjected to electromagnetic induction heating.

As a result of intensive studies, the present inventors have found that the above problems can be solved by configuring a honeycomb structure such that, in cells serving as flow paths for a fluid in the honeycomb structure, a plurality of wire pieces made of a magnetic substance are provided apart from each other via spaces or buffer materials in an extending direction of the cells. That is, the present invention is specified as follows:

(1) A pillar shaped honeycomb structure, comprising:
  an outer peripheral wall; and
  porous partition walls disposed on an inner side of the outer peripheral wall, the partition walls defining a plurality of cells, each of the cells extending from one end face to other end face to form a flow path,
  wherein the cells include a plurality of wire pieces comprising a magnetic substance, the wire pieces being provided apart from each other via a space or a buffer material in an extending direction of the cells.

(2) An exhaust gas purifying device, comprising:
  the honeycomb structure according to (1);
  a coil wiring that spirally surrounds an outer circumference of the honeycomb structure; and
  a metal pipe for housing the honeycomb structure and the coil wiring.

According to the present invention, it is possible to provide a honeycomb structure and an exhaust gas purifying device, which has improved thermal shock resistance and oxidation resistance when the honeycomb structure is subjected to electromagnetic induction heating.

DETAILED DESCRIPTION OF THE INVENTION

Hereinafter, embodiments of a honeycomb structure according to the present invention will be described with reference to the drawing. However, the present invention is not limited to these embodiments, and various changes, modifications, and improvements may be made based on knowledge of one of ordinary skill in the art, without departing from the scope of the present invention.

<1. Honeycomb Structure>

Embodiment 1

Figure 1:
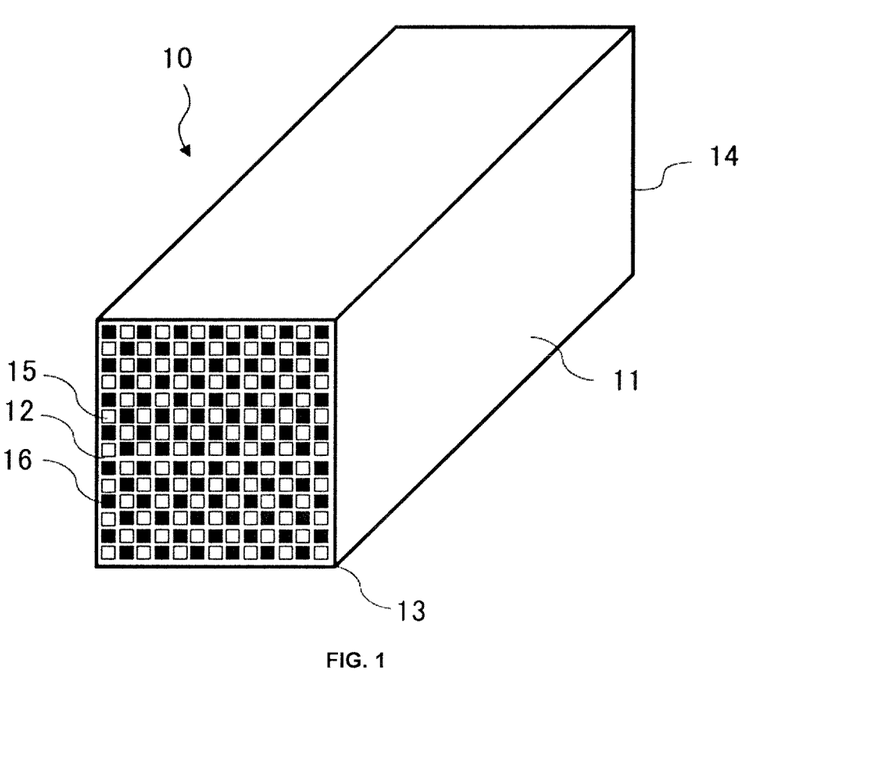
FIG. 1 is a perspective view schematically showing a honeycomb structure according to Embodiment 1 of the present invention.
Figure 2:
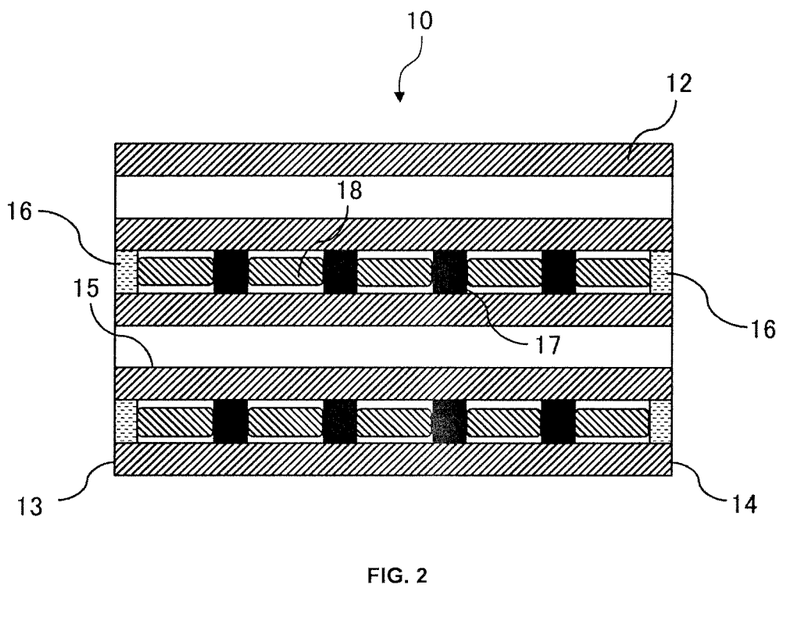
FIG. 2 is a cross-sectional view schematically showing a cross section of a honeycomb structure 10 according to Embodiment 1 of the present invention, which is parallel to an extending direction of cells 15.

FIG. 1 is a perspective view schematically showing a honeycomb structure according to Embodiment 1 of the present invention. FIG. 2 is a cross-sectional view schematically showing a cross section of the honeycomb structure 10 according to Embodiment 1 of the present invention, which is parallel to an extending direction of cells 15. The honeycomb structure 10 is structured in a pillar shape, and include an outer peripheral wall 11 and porous partition walls 12 which are arranged on an inner side of the outer peripheral wall 11 and define a plurality of cells 15 that extend from one end face 13 to the other end face 14 to form flow paths.

A part of the plurality of cells 15 is provided with wire pieces 18, which will be described below in detail. The position of the cell 15 to be provided with the wire pieces 18 is not particularly limited. For example, in a cross section perpendicular to the extending direction of the cells 15, the cells 15 which are provided with the wire pieces 18 and the cells 15 which are not provided with the wire pieces 18 may be alternately arranged in a vertical direction and a horizontal direction. Thus, the alternately arranging of the cells 15 which are provided with the wire pieces 18 and the cells 15 which are not provided with the wire pieces 18 can result in better electromagnetic induction heating efficiency. The arrangement position and the number of arrangements of the cells 15 which are provided with the wire pieces 18 can be appropriately designed in view of the heating efficiency and the pressure loss of the honeycomb structure 10.

The wire pieces 18 are made of a magnetic substance, and a plurality of the wire pieces 18 are provided apart from each other in the cells 15 via buffer materials 17 in the extending direction of the cells 15. That is, the wire piece 18 and the buffer material 17 are alternately arranged adjacent to each other in the extending direction of the cells 15. Further, one end face 13 and other end face 14 of the cells 15 which are provided with the wire pieces 18 are provided with plugged portions 16, respectively. The plugged portions 16 may employ those having the same structure as that of plugged portions of a conventionally known honeycomb structure.

Figure 3:
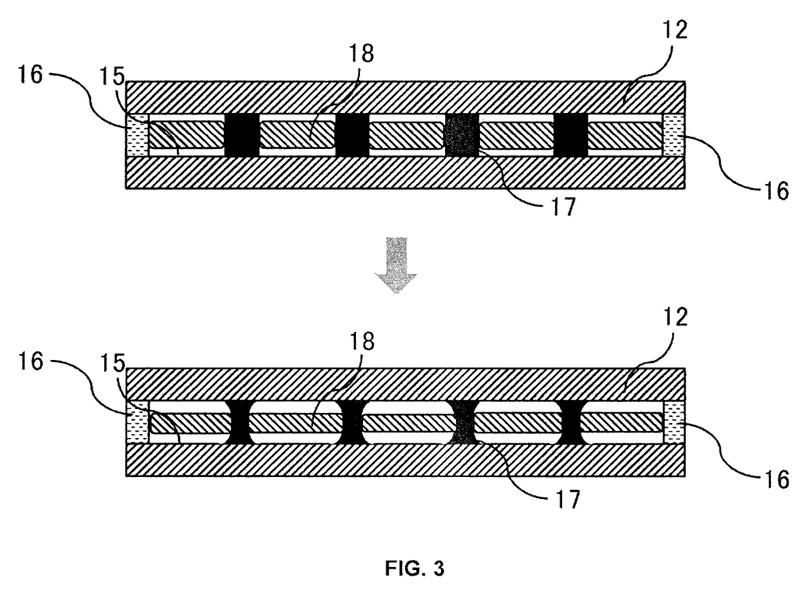
FIG. 3 is cross-sectional views schematically showing cross sections of honeycomb structures 10 according to Embodiment 1 before electromagnetic induction heating (the upper view) and after electromagnetic induction heating (the lower view), which are parallel to an extending direction of cells 15.

Effects of the honeycomb structure 10 according to Embodiment 1 of the present invention will be described with reference to FIG. 3. The upper view of FIG. 3 shows a schematic view of the cell 15 provided with the wire pieces 18 in the honeycomb structure 10. In the cell 15, the plugged portions 16 are provided on both end faces 13 and 14, and a plurality of wire pieces 18 are arranged apart from each other via the buffer material 17 in the extending direction of the cell 15 so as to be in contact with the plugged portions 16. The electromagnetic induction heating of the honeycomb structure 10 including the cells 15 having such a structure leads to an increase in the temperature and expansion of the plurality of wire pieces 18 made of the magnetic substance, as shown in the lower view of FIG. 3. In this case, since each of the buffer materials 17 is provided between the adjacent wire pieces 18, the buffer materials 17 absorbs portions extended by the expansion of the wire pieces 18. Therefore, it is possible to satisfactorily suppress the destruction of the plugged portions provided on both end faces 13 and 14 of the cells 15 due to the expansion of the wire pieces 18. Further, as the magnetic substance, the wire pieces 18 having a lower surface area are used in place of magnetic fine particles having a higher surface area. Therefore, the heating by means of electromagnetic induction heating leads to a difficulty to oxidize so that deterioration of heating performance can be satisfactorily suppressed. Further, since the magnetic fine particles have a lower volume, high-frequency induction heating is required for electromagnetic induction heating, which increases the cost of a power source and the like. However, since the wire pieces 18 having a higher volume than that of the magnetic fine particles are used, the cost of the power supply and the like is reduced.

Although FIGS. 2 and 3 show a configuration where each of the buffer materials 17 is provided between the adjacent wire pieces 18, the present invention is not limited thereto, and each space may be formed between the adjacent wire pieces 18. In this case, for example, a part of the side surface of the wire piece 18 can fixed to the partition wall 12 with a joining material and thus arranged in the cell. Examples of the joining material that can be used herein include a paste prepared by appropriately adding a pore former, an organic binder and water to cordierite powder.

Even if the spaces are thus provided in place of the buffer materials 17, the spaces absorb the portions extended by expansion of the wire pieces 18 made of a magnetic material when the temperature of the wire pieces 18 is increased and they are expanded during electromagnetic induction heating as described above, so that the breakage of the plugged portions provided on both end faces 13 and 14 of the cell 15 can be satisfactorily suppressed.

The wire pieces 18 preferably have a thermal expansion coefficient of 8 to $12 \times 10^{-6}$/° C. Upon the electromagnetic induction heating of the honeycomb structure 10, a thermal expansion coefficient of the wire pieces 18 higher than $12 \times 10^{-6}$/° C. will require an increased length of the buffer material or the space portion in order to absorb the portions extended by the expansion of the wire pieces 18, so that it may be difficult to have a sufficient wire length to maintain the required heating performance. Further, there is substantially no magnetic material having a thermal expansion coefficient lower than $8 \times 10^{-6}$/° C. The thermal expansion coefficient as used herein refers to a thermal expansion coefficient at 900° C. when 25° C. is used as a reference temperature.

Examples of the magnetic substance having a thermal expansion coefficient of 8 to $12 \times 10^{-6}/°$ C. include a FeCo alloy containing 10% by mass or more of Co, or stainless steel, and the like. Examples of the FeCo alloy containing 10% by mass or more of Co include permendur, the balance Fe-49% by mass Co-2% by mass V, the balance Fe-17% by mass Co-2% by mass Cr-1% by mass Mo, and the like. Further, the stainless steel includes ferrite-based stainless steels such as SUS 430f.

The wire pieces 18 are magnetic substances and are magnetized by a magnetic field, and a state of magnetization varies depending on the intensity of the magnetic field. This is represented by a "magnetization curve". The magnetization curve may have a magnetic field H on a horizontal axis and a magnetic flux density B on a vertical axis (B-H curve). A state where no magnetic field is applied to the magnetic substance refers to a degaussing state, which is represented by an origin O. As a magnetic field is applied, a curve in which the magnetic flux density increases from the origin O to a saturated state is drawn. This curve is an "initial magnetization curve". A slope of a straight line connecting a point on the initial magnetization curve to the origin is a "magnetic permeability". The magnetic permeability indicates an ease of magnetization of the magnetic substance in such a sense that the magnetic field permeates. The magnetic permeability near the origin where the magnetic field is smaller is an "initial magnetic permeability", and a magnetic permeability that is maximum on the initial magnetization curve is a "maximum magnetic permeability".

The wire pieces 18 preferably have a maximum magnetic permeability of 10,000 or more. According to such a configuration, when the honeycomb structure 10 having the wire pieces 18 is subjected to the electromagnetic induction heating, the temperature can be raised in a short period of time until a temperature at which water vaporizes (about 100° C.), and further until a temperature at which the catalyst is activated (about 300° C.). The wire pieces 18 may more preferably have a maximum magnetic permeability of 25,000 or more, and even more preferably a maximum magnetic permeability of 50,000 or more. Examples of the magnetic substance having a maximum magnetic permeability of 10,000 or more include the balance Fe-10% by mass of Si-5% by mass of Al, 49% by mass of Co-49% by mass of Fe-2% by mass of V, and the balance Fe-36% by mass of Ni, the balance Fe-45% by mass of Ni, and the like.

The wire pieces 18 preferably have a Curie temperature of 600° C. or more. The Curie temperature of the wire pieces 18 of 600° C. or more can enable a honeycomb temperature sufficient to increase the catalyst temperature to the catalyst activation temperature or more to be reached, as well as this can lead to ease to burn out and remove PMs (particulate matters) collected in the first cells 15 to regenerate a honeycomb structure filter. The magnetic substances having a curry temperature of 600° C. or more include, for example, the balance Co-20% by mass of Fe; the balance Co-25% by mass of Ni-4% by mass of Fe; the balance Fe-15-35% by mass of Co; the balance Fe-17% by mass of Co-2% by mass of Cr-1% by mass of Mo; the balance Fe-49% by mass of Co-2% by mass of V; the balance Fe-18% by mass of Co-10% by mass of Cr-2% by mass of Mo-1% by mass of Al; the balance Fe-27% by mass of Co-10% by mass of Nb; the balance Fe-20% by mass of Co-1% by mass of Cr-2% by mass of V; the balance Fe-35% by mass of Co-1% by mass of Cr; pure cobalt; pure iron; electromagnetic soft iron; the balance Fe-0.1-0.5% by mass of Mn; the balance Fe-3% by mass Si; and the like. Here, the Curie temperature of the magnetic substance refers to a temperature at which a ferromagnetic property is lost.

The wire pieces 18 preferably have an intrinsic resistance value of 10 μΩcm to 100 μΩm at 25° C. The wire pieces 18 having the intrinsic resistance value of 10 μΩcm or more at 25° C. can lead to an increased amount of heat generated by electromagnetic induction heating because of the higher resistance value. Also, the wire pieces having the intrinsic resistance value of 100 μΩcm or less at 25° C. can lead to an increased number of portions where electric current flows due to the electromagnetic induction, so that an amount of heat generated by electromagnetic induction heating can further be increased. Examples of the magnetic substances having an intrinsic resistance value of 10 μΩcm or more at 25° C. include the balance Fe-18% by mass of Cr; the balance Fe-13% by mass of Cr-2% by mass of Si; the balance Fe-20% by mass of Cr-2% by mass of Si-2% by mass of Mo; the balance Fe-10% by mass of Si-5% by mass of Al; the balance Co-20% by mass Fe; the balance Fe-15 to 35% by mass Co; the balance Fe-49% by mass Co-2% by mass V; the balance Fe-18% by mass of Co-10% by mass of Cr-2% by mass of Mo-1% by mass of Al; the balance Fe-36% by mass of Ni; the balance Fe-45 by mass of Ni; and the like.

The wire pieces 18 preferably have a coercive force of 100 Nm or more. According to such a configuration, when the honeycomb structure 10 having the wire pieces 18 is subjected to the electromagnetic induction heating, the temperature can be raised in a short period of time until a temperature at which water vaporizes (about 100° C.), and further until a temperature at which the catalyst is activated (about 300° C.). The magnetic substances having a coercive force of 100 Nm or more include the balance Fe-35% by mass of Co; the balance Fe-20% by mass of Co-1% by mass of V; the balance Fe-13% by mass of Cr-2% by mass of Si; the balance Fe-18% by mass of Cr; and the like.

Each of the wire pieces 18 preferably has a length of 1 to 20 mm in the extending direction of the cells. The length of each wire piece 18 of 1 mm or more can provide better electromagnetic induction heating efficiency. Further, the length of each wire piece 18 of 20 mm or less can suppress the extension of each wire piece 18 due to the expansion, so that any breakage of the plugged portions 16 can satisfactorily be suppressed. The length of each of the wire pieces 18 in the extending direction of the cells is more preferably 3 to 15 mm, and even more preferably 4 to 6 mm. The plurality of wire pieces 18 provided in the cell 15 may have the same length as or different lengths from each other.

The outer diameter of each of the wire pieces 18 may be the same as the inner diameter of the cell 15, or may be smaller than the inner diameter of the cell 15. Further, the outer diameters of the plurality of wire pieces 18 may be the same as or different from each other.

Each buffer material 17 or each space provided between the plurality of wire pieces 18 may have any size as long as it is formed to a size that can completely absorb the extension due to the expansion when the plurality of wire pieces 18 provided in the cell 15 are heated and thermally expanded during electromagnetic induction heating. The length of each buffer material 17 or space in the extending direction of the cell is preferably 1 mm or more. According to such a configuration, the plurality of wire pieces 18 can further satisfactorily absorb the extension due to expansion when the temperature increases during electromagnetic induction heating and thermal expansion occurs. The length of each buffer material 17 or space in the extending direction of the cell is more preferably 2 mm or more, and even more preferably 2 to 3 mm. The plurality of buffer materials 17 or the spaces provided in the cell 15 may have the same length as or different lengths from each other.

It is preferable that the total length of the buffer materials 17 or the spaces in the extending direction of the cell 15 is ⅕ or more of the total length of the wire pieces 18 in the extending direction of the cell 15. According to such a configuration, the plurality of wire pieces 18 can better absorb the extension due to expansion when the temperature increases during electromagnetic induction heating and thermal expansion occurs. It is more preferable that the total length of the buffer materials 17 or the spaces in the extending direction of the cell 15 is ⅕ to ½, even more preferably ⅕ to ⅓, of the total length of the wire pieces 18 in the extending direction of the cell 15.

The buffer materials 17 preferably have a Young's modulus of 50 to 500 MPa. The Young's modulus of the buffer materials 17 of 500 MPa or less can lead to better absorption of the extension due to expansion when the temperature increases during electromagnetic induction heating and thermal expansion occurs. Further, the Young's modulus of the buffer material 17 of 50 MPa or more can allow the mechanical strength to be maintained, so that cracks generated by extension due to expansion can be satisfactorily suppressed when the temperature increases during electromagnetic induction heating and thermal expansion occurs. The buffer materials 17 preferably have a Young's modulus of 100 to 400 MPa, and even more preferably 200 to 300 MPa.

The buffer materials 17 preferably have a porosity of 40 to 70%. The porosity of the buffer materials 17 of 40% or more leads to decreased Young's modulus of the buffer materials 17, and provide better absorption of the extension due to expansion when the temperature increases during electromagnetic induction heating and thermal expansion occurs. Further, the porosity of the buffer materials 17 of 70% or less can allow the mechanical strength of the buffer materials 17 to be maintained, so that cracks generated by extension due to expansion can be suppressed when the temperature increases during electromagnetic induction heating and thermal expansion occurs. The buffer materials 17 preferably have a porosity of 40 to 60%, and even more preferably 45 to 50%.

The buffer materials 17 can be made of cordierite, silica, a ceramic material, or the like.

Although materials of the partition walls 12 and the outer peripheral wall 11 of the honeycomb structure 10 are not particularly limited, the honeycomb structure is required to be a porous body having a large number of pores. Therefore, the honeycomb structure 10 is typically formed of a ceramic material. Examples of the ceramic material include a sintered body of ceramics comprised of cordierite, silicon carbide, aluminum titanate, silicon nitride, mullite, alumina, a silicon-silicon carbide-based composite material, or silicon carbide-cordierite based composite material, in particular, a sintered body mainly based on a silicon-silicon carbide composite material or silicon carbide. As used herein, the expression "silicon carbide-based" means that the honeycomb structure 10 contains silicon carbide in an amount of 50% by mass or more of the entire honeycomb structure 10. The phrase "the honeycomb structure 10 is mainly based on a silicon-silicon carbide composite material" means that the honeycomb structure 10 contains 90% by mass or more of the silicon-silicon carbide composite material (total mass) based on the entire honeycomb structure 10. Here, for the silicon-silicon carbide composite material, it contains silicon carbide particles as an aggregate and silicon as a binding material for binding the silicon carbide particles, and a plurality of silicon carbide particles are preferably bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure 10.

Preferably, the honeycomb structure 10 is formed of at least one ceramic material selected from the group consisting of cordierite, silicon carbide, aluminum titanate, silicon nitride, mullite, and alumina.

The shape of the cell 15 of the honeycomb structure 10 may be, but not particularly limited to, a polygonal shape such as a triangle, a quadrangle, a pentagon, a hexagon and an octagon; a circular shape; an ellipse shape; or other irregular shape, in a cross section orthogonal to the central axis of the honeycomb structure 10.

Further, an outer shape of the honeycomb structure 10 may be, but not particularly limited to, a shape such as a pillar shape with circular end faces (cylindrical shape), a pillar shape with oval end faces, and a pillar shape with polygonal (quadrangular, pentagonal, hexagonal, heptagonal, octagonal, and the like) end faces, and the like. Furthermore, the size of the honeycomb structure 10 is not particularly limited, and an axial length of the honeycomb structure is preferably from 40 to 500 mm. Further, for example, when the outer shape of the honeycomb structure 10 is cylindrical, a radius of each end face is preferably from 50 to 500 mm.

Each of the partition walls 12 of the honeycomb structure 10 preferably has a thickness of from 0.10 to 0.50 mm, and more preferably from 0.25 to 0.45 mm, in terms of ease of production. For example, the thickness of 0.10 mm or more improves the strength of the honeycomb structure 10. The thickness of 0.50 mm or less can result in lower pressure loss when the honeycomb structure 10 is used as a filter. It should be noted that the thickness of the partition walls 12 is an average value measured by a method for observing the axial cross section with a microscope.

Further, the partition walls 12 forming the honeycomb structure 10 preferably have a porosity of from 30 to 70%, and more preferably from 40 to 65%, in terms of ease of production. The porosity of 30% or more tends to decrease a pressure loss. The porosity of 70% or less can maintain the strength of the honeycomb structure 10.

The porous partition walls 12 preferably have an average pore size of from 5 to 30 μm, and more preferably from 10 to 25 μm. The average pore size of 5 μm or more can decrease the pressure loss when the honeycomb structure 10 is used as a filter. The average pore size of 30 μm or less can maintain the strength of the honeycomb structure 10. As used herein, the terms "average pore diameter" and "porosity" mean an average pore diameter and a porosity measured by mercury porosimeter, respectively.

The honeycomb structure 10 preferably has a cell density in a range of from 5 to 93 cells/cm$^2$, and more preferably 5 to 63 cells/cm$^2$, and even more preferably in a range of from 31 to 54 cells/cm$^2$, although not particularly limited thereto.

Such a honeycomb structure 10 is produced by forming a green body containing a ceramic raw material into a honeycomb shape having partition walls 12 that extend from one end face to other end face and define a plurality of cells 15 to form flow paths for a fluid, to form a honeycomb formed body, and drying the honeycomb formed body and then firing it. When such a honeycomb structure is used as the honeycomb structure 10 according to the present embodiment, the outer peripheral wall may be integrally extruded with a honeycomb structure portion, which is used as the outer peripheral wall as it is, or an outer circumference of the honeycomb formed body (honeycomb structure) may be ground and shaped into a predetermined shape after forming or firing it, and a coating material may be applied to the outer circumference-ground honeycomb structure to form an outer peripheral coating. In the honeycomb structure 10 of this embodiment, for example, a honeycomb structure having an outer circumference without grinding the outermost circumference of the honeycomb structure may be used, and the coating material may be further applied onto the outer peripheral surface of the honeycomb structure having the outer circumference (that is, a further outer side of the outer circumference of the honeycomb structure) to form the outer coating. That is, in the former case, only the outer peripheral coating made of the coating material forms the outer peripheral surface positioned on the outermost circumference. On the other hand, in the latter case, an outer peripheral wall having a two-layered structure positioned on the outermost periphery is formed in which the outer peripheral coating made of the coating material is further laminated on the outer peripheral surface of the honeycomb structure. The outer peripheral wall may be extruded integrally with the honeycomb structure portion and fired as it is, which may be used as the outer peripheral wall without processing the outer circumference.

A composition of the coating material is not particularly limited, and various known coating materials can be appropriately used. The coating material may further contain colloidal silica, an organic binder, clay and the like. The organic binder is preferably used in an amount of from 0.05 to 0.5% by mass, and more preferably from 0.1 to 0.2% by mass. Further, the clay is preferably used in an amount of from 0.2 to 2.0% by mass, and more preferably from 0.4 to 0.8% by mass.

The honeycomb structure 10 is not limited to an integral type honeycomb structure 10 in which the partition walls 12 are integrally formed. For example, the honeycomb structure 10 may be a honeycomb structure 10 in which pillar shaped honeycomb segments each having a plurality of cells 15 defined by the porous partition walls 12 to form flow paths for a fluid are combined via joining material layers (which, hereinafter, may be referred to as a "joined honeycomb structure").

The honeycomb structure 10 can be a honeycomb structure with joined honeycomb segments obtained by, using each of fired honeycomb structures as a honeycomb segment, joining and integrating the side faces of the plurality of honeycomb segments with a joining material. For example, the honeycomb structure in which the honeycomb segments are joined can be produced as follows.

First, the joining material is applied to joining surfaces (side surfaces) of each honeycomb segment while attaching joining material adhesion preventing masks to both end faces of each honeycomb segment. These honeycomb segments are then arranged adjacent to each other such that the side surfaces of the honeycomb segments are opposed to each other, and the adjacent honeycomb segments are pressure-bonded together, and then heated and dried. Thus, the honeycomb structure in which the side surfaces of the adjacent honeycomb segments are joined with the joining material is produced. For the honeycomb structure, the outer peripheral portion may be ground into a desired shape (for example, a cylindrical shape), and the coating material may be applied to the outer peripheral surface, and then heated and dried to form an outer peripheral wall 11.

The material of the joining material adhesion preventing mask that can be suitably used herein includes, but not particularly limited to, synthetic resins such as polypropylene (PP), polyethylene terephthalate (PET), polyimide, Teflon (registered trademark) and the like. Further, the mask is preferably provided with an adhesive layer, and the material of the adhesive layer is preferably an acrylic resin, a rubber (for example, a rubber mainly based on a natural rubber or a synthetic rubber), or a silicon resin.

Examples of the joining material adhesion preventing mask that can be suitable used herein include, for example, an adhesive film having a thickness of from 20 to 50 µm.

The joining material that can be used herein may be prepared by, for example, mixing ceramic powder, a dispersion medium (for example, water or the like), and optionally additives such as a binder, a deflocculant and a foaming resin. The ceramics may be preferably ceramics containing at least one selected from the group consisting of cordierite, mullite, zircon, aluminum titanate, silicon carbide, silicon nitride, zirconia, spinel, indialite, sapphirine, corundum, and titania, and more preferably having the same material as that of the honeycomb structure. The binder includes polyvinyl alcohol, methyl cellulose, CMC (carboxymethyl cellulose) and the like.

The honeycomb structure 10 may have surface layers having permeability on at least a part of the surfaces of the partition walls 12. As used herein, "permeability" means that a permeability of each surface layer is $1.0 \times 10^{-13}$ m$^2$ or more. From the viewpoint of further reducing the pressure loss, the permeability is preferably $1.0 \times 10^{-12}$ m$^2$ or more. Since each surface layer has the permeability, the pressure loss of the honeycomb structure 10 caused by the surface layers can be suppressed.

Further, as used herein, the "permeability" refers to a physical property value calculated by the following equation (1), which value is an index indicating passing resistance when a certain gas passes through an object (partition walls 12). Here, in the following equation (1), C represents a permeability (m$^2$), F represents a gas flow rate (cm$^3$/s), T represents a thickness of a sample (cm), V represents a gas viscosity (dynes·sec/cm$^2$), D represents a diameter of a sample (cm), P represents a gas pressure (PSI). The numerical values in the following equation (1) are: 13.839 (PSI)=1 (atm) and 68947.6 (dynes·sec/cm$^2$)=1 (PSI).

[Equation 1]

$$C = \frac{8FTV}{\pi D^2 (P^2 - 13.839^2)/13.839 \times 68947.6} \times 10^{-4} \quad (1)$$

When measuring the permeability, the partition walls 12 with the surface layers are cut out, the permeability is measured on the partition walls 12 with the surface layers, and the permeability is then measured on the partition walls 12 from which the surface layers have been removed. From a ratio of thicknesses of the surface layer and the partition wall and the permeability measurement results, the permeability of the surface layers is calculated.

The surface layers preferably have a porosity of 50% or more, and more preferably 60% or more, and still more preferably 70% or more. By having the porosity of 50% or more, the pressure loss can be suppressed. However, if the porosity is too high, the surface layers become brittle and easily peels off. Therefore, the porosity is preferably 90% or less.

As a method of measuring the porosity of the surface layers by the mercury press-in method, a difference between a mercury porosity curve of a sample having a substrate and surface layers and a mercury porosity curve of only the substrate from which only the surface layers have been scrapped off and removed is determined to be a mercury porosity curve of the surface layers, and the porosity of the surface layers is calculated from the mass of the scraped surface layers and the mercury porosity curve. A SEM image may be taken, and the porosity of the surface layers may be calculated from an area ratio of the void portions and the solid portions by image analysis of the surface layer portions.

The surface layers preferably have an average pore diameter of 10 μm or less, and more preferably 5 μm or less, and further preferably 4 μm or less, and particularly preferably 3 μm or less. The average pore diameter of 10 μm or less can achieve a higher particle collection efficiency. However, if the average pore diameter of the surface layers is too low, the pressure loss will increase. Therefore, the average pore diameter is preferably 0.5 μm or more.

As a method of measuring the average pore diameter of the surface layers by the mercury press-in method, in the form of peak values in the mercury porosimeter, a difference between a mercury porosity curve (pore volume frequency) on the substrate on which the surface layers are formed and a mercury porosity curve on only the substrate from which only the surface layers have been scrapped off and removed is determined to be a mercury porosity curve of the surface layers, and its peak is determined to be the average pore diameter. Further, a SEM image of the cross section of the honeycomb structure 10 may be taken, and the surface layer portion may be subject to image analysis to binarize the void portions and the solid portions, and twenty or more voids may be randomly selected to average the inscribed circles, and the average may be determined to be the average pore diameter.

Further, the thickness of each surface layer is not particularly limited. However, in order to obtain the effect of the surface layers more remarkably, the thickness of each surface layer is preferably 10 μm or more. On the other hand, from the viewpoint of avoiding an increase in pressure loss, the thickness of each surface layer is preferably 80 μm or less. The thickness of each surface layer is more preferably 50 μm or less. For a method of measuring the thickness of each surface layer, for example, the honeycomb structure 10 on which the surface layers are formed is cut in a direction perpendicular to the extending direction of the cells, and the thickness of each surface layer is measured from the cross section of the honeycomb structure 10, and the measured thicknesses at arbitrary five points can be averaged.

Next, the method for producing the honeycomb structure 10 will be described. First, the honeycomb structure having the porous partition walls and the plurality of cells defined by the partition walls is produced. For example, when producing the honeycomb structure made of cordierite, a cordierite-forming raw material is firstly prepared. The cordierite-forming raw material contains a silica source component, a magnesia source component, and an alumina source component, and the like, in order to formulate each component so as to have a theoretical composition of cordierite. Among them, the silica source component that can be used herein includes preferably quartz and fused silica, and the particle diameter of the silica source component is preferably from 100 to 150 μm.

Examples of the magnesia source component include talc and magnesite. Among them, talc is preferred. The talc is preferably contained in an amount of from 37 to 43% by mass in the cordierite-forming raw material. The talc preferably has a particle diameter (average particle diameter) of from 5 to 50 μm, and more preferably from 10 to 40 μm. Further, the magnesia (MgO) source component may contain $Fe_2O_3$, CaO, $Na_2O$, $K_2O$ and the like as impurities.

The alumina source component preferably contains at least one of aluminum oxide and aluminum hydroxide, in terms of fewer impurities. Further, aluminum hydroxide is preferably contained in an amount of from 10 to 30% by mass, and aluminum oxide is preferably contained in an amount of from 0 to 20% by mass, in the cordierite-forming raw material.

A material for a green body to be added to the cordierite-forming raw material (additive) is then prepared. At least a binder and a pore former are used as additives. In addition to the binder and the pore former, a dispersant or a surfactant can be used.

The pore former that can be used herein includes a substance that can be oxidatively removed by reacting with oxygen at a temperature equal to or lower than a firing temperature of cordierite, or a low melting point reactant having a melting point at a temperature equal to or lower than the firing temperature of cordierite, or the like. Examples of the substance that can be oxidatively removed include resins (particularly particulate resins), graphite (particularly particulate graphite) and the like. Examples of the low melting point reactant that can be used herein include at least one metal selected from the group consisting of iron, copper, zinc, lead, aluminum, and nickel, alloys mainly based on those metals (e.g., carbon steel and cast iron for iron, and stainless steel), or alloys mainly based on two or more of those metals. Among them, the low melting point reactant is preferably an iron alloy in the form of powder or fiber. Further, the low melting point reactant preferably has a particle diameter or a fiber diameter (an average diameter) of from 10 to 200 μm. Examples of a shape of the low melting point reactant include a spherical shape, a wound-lozenge shape, a confetti shape, and the like. These shapes are preferable because the shape of the pores can be easily controlled.

Examples of the binder include hydroxypropylmethyl cellulose, methyl cellulose, hydroxyethyl cellulose, carboxymethyl cellulose, polyvinyl alcohol and the like. Further, examples of the dispersant include dextrin, polyalcohol and the like. Furthermore, examples of the surfactant include fatty acid soaps. The additive may be used alone or in combination of two or more.

Subsequently, to 100 parts by mass of the cordierite-forming raw material are added from 3 to 8 parts by mass of the binder, from 3 to 40 parts by mass of the pore former, from 0.1 to 2 parts by mass of the dispersant, and from 10 to 40 parts by mass of water, and these materials for a green body are kneaded to prepare a green body.

The prepared green body is then formed into a honeycomb shape by an extrusion molding method, an injection molding method, a press molding method, or the like to obtain a raw honeycomb formed body. The extrusion molding method is preferably employed, because continuous molding is easy, and, for example, cordierite crystals can be oriented. The extrusion molding method can be performed using an apparatus such as a vacuum green body kneader, a ram type extrusion molding machine, a twin-screw type continuous extrusion molding machine, or the like.

The honeycomb formed body is then dried and adjusted to a predetermined size to obtain a honeycomb dried body. The honeycomb formed body can be dried by hot air drying, microwave drying, dielectric drying, drying under reduced pressure, vacuum drying, freeze drying and the like. It is preferable to perform combined drying of the hot air drying and the microwave drying or dielectric drying, because the entire honeycomb formed body can be rapidly and uniformly dried.

Subsequently, the wire pieces made of the magnetic substance and the buffer materials made of cordierite or the like are alternately provided in the defined cells of the honeycomb dried body. When the spaces are provided in place of the buffer materials, the joining material is provided on the side surface of each wire piece, and the wire piece is fixed to the cell wall.

Subsequently, a raw material for the plugged portions is prepared. The material for the plugged portions (plugging slurry) may use the same material for a green body as that of the partition walls (honeycomb dried body), or may use a different material. Specifically, the raw material for the plugged portions can be obtained by mixing a ceramic raw material, a surfactant, and water, and optionally adding a sintering aid, a pore former and the like to form a slurry, which is kneaded using a mixer or the like.

Subsequently, masks are applied onto some of cell opening portions on one end face of the honeycomb dried body, and the end face is immersed in a storage container in which the plugging slurry is stored to fill the non-masked cells with the plugging slurry. Similarly, masks are applied onto some of cell opening portions on the other end face of the honeycomb dried body, and the end face is immersed in a storage container in which the plugging slurry is stored to fill the non-masked cells with the plugging slurry. Thus, both ends of each cell provided with the wire pieces are plugged. It is then dried and fired to obtain a honeycomb structure having plugged portions. As the drying conditions, the same conditions as those for drying the honeycomb formed body can be used. Further, the conditions for the above firing can be typically in an air atmosphere at a temperature of 1410 to 1440° C. for 3 to 15 hours, when the cordierite-forming raw material is used.

A method of plugging is simply carried out by pushing a paste-like material into the cells with a spatula such as a squeegee. It is easy to control the depth by the number of squeegee processes pushed. The number of pushing processes is increased for the portions of the cells desired to insert the magnetic material deeply, and the number of pushing processes is decreased for shallow portions around the former cells.

Further, when the resulting honeycomb structure is produced in a state where the outer peripheral wall is formed on the outer peripheral surface of the honeycomb structure, the outer peripheral surface may be ground to remove the outer peripheral wall. The coating material is applied to the outer circumference of the honeycomb structure from which the outer peripheral wall has thus been removed, in a subsequent step, to form an outer peripheral coating. Further, when grinding the outer peripheral surface, a part of the outer peripheral wall may be ground and removed, and on that part, the outer peripheral coating may be formed by the coating material. When preparing the coating material, it can be prepared using, for example, a biaxial rotary type vertical mixer.

Further, the coating material may further contain colloidal silica, an organic binder, clay and the like. The content of the organic binder is preferably from 0.05 to 0.5% by mass, and more preferably from 0.1 to 0.2% by mass. The content of the clay is preferably from 0.2 to 2.0% by mass, and more preferably from 0.4 to 0.8% by mass.

The coating material is applied onto the outer peripheral surface of the honeycomb structure previously produced, and the applied coating material is dried to form an outer peripheral coating. Such a structure can allow for effective suppression of cracking in the outer peripheral coating during the drying and the heat treatment.

Examples of a method for coating the coating material can include a method for applying the coating material by placing the honeycomb structure on a rotating table and rotating it, and pressing a blade-shaped applying nozzle along the outer peripheral portion of the honeycomb structure while discharging the coating material from the applying nozzle. Such a configuration can allow the coating material to be applied with a uniform thickness. Further, this method can lead to a decreased surface roughness of the formed outer peripheral coating, and can result in an outer peripheral coating that has an improved appearance and is difficult to be broken by thermal shock.

When the outer peripheral surface of the honeycomb structure is ground and the outer peripheral wall is removed, the coating material is applied onto the entire outer peripheral surface of the honeycomb structure to form the outer peripheral coating. On the other hand, when the outer peripheral wall is present on the outer peripheral surface of the honeycomb structure or a part of the outer peripheral wall is removed, the coating material may be partially applied to form the outer peripheral coating, or the coating material may be, of course, applied onto the entire outer peripheral surface of the honeycomb structure to form the outer peripheral coating.

The method for drying the applied coating material (i.e., the undried outer peripheral coating) is not limited, but in terms of preventing dry-cracking, it can suitably use, for example, a method of drying 25% or more of a water content in the coating material by maintaining the coating material at room temperature for 24 hours or more, and then maintaining it in an electric furnace at 600° C. for 1 hour or more to remove moisture and organic matters.

Further, when the opening portions of the cells of the honeycomb structure are not plugged in advance, plugging may be performed in the opening portions of the cells after forming the outer peripheral coating.

Furthermore, the silicon carbide powder contained in the coating material develops color by irradiating the outer peripheral surface of the resulting honeycomb structure with laser. Therefore, product information or the like may be printed (marked) on the outer peripheral coating of the resulting honeycomb structure by irradiating it with laser light.

Preferred examples of laser light used for marking with laser include carbon dioxide gas ($CO_2$) laser, YAG laser and $YVO_4$ laser. Laser conditions for irradiation with the laser light can be appropriately selected according to the type of the laser to be used. For example, when the $CO_2$ laser is used, the marking is preferably carried out at an output of from 15 to 25 W and a scan speed of from 400 to 600 mm/s. Such a marking method allows the irradiated portion to develop color so as to present dark color such as black to green, resulting in very good contrast due to color development to the non-irradiated portion.

Embodiment 2

Figure 4:
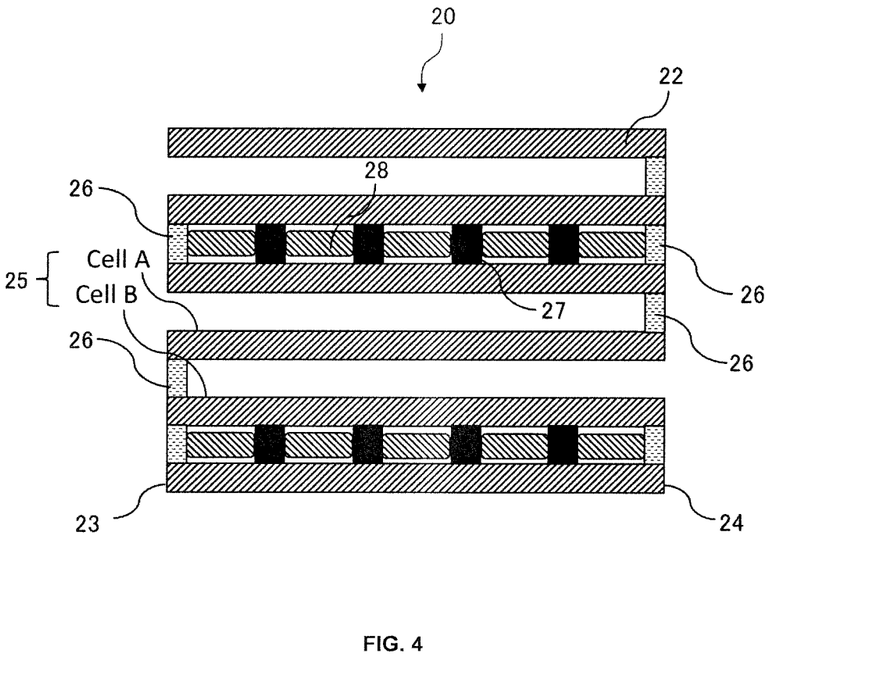
FIG. 4 is a cross-sectional view schematically showing a cross section of a honeycomb structure 20 according to Embodiment 2 of the present invention, which is parallel to an extending direction of cells 15.

Next, a honeycomb structure 20 according to Embodiment 2 will be described. FIG. 4 is a cross-sectional view schematically showing a cross section of the honeycomb structure 20 according to Embodiment 2 of the present invention, which is parallel to an extending direction of cells 25. The honeycomb structure 20 is structured in a pillar shape, and include an outer peripheral wall 21 and porous partition walls 22 which are arranged on an inner side of the outer peripheral wall 21 and define a plurality of cells 25 that extend from one end face 23 to the other end face 24 to form flow paths.

A part of the plurality of cells 25 is provided with wire pieces 28. The wire pieces 28 are made of a magnetic substance, and a plurality of the wire pieces 28 are provided apart from each other in the cells 25 via buffer materials 27 in the extending direction of the cells 25. A space may be provided between the adjacent wire pieces 28 in place of the buffer material 27. Further, one end face 23 and other end face 24 of the cells 25 which are provided with the wire pieces 28 are provided with plugged portions 26, respectively.

The honeycomb structure 20 according to Embodiment 2 of the present invention is different from the honeycomb structure 10 according to Embodiment 1 of the present invention in that the former forms a filter structure. That is, in the honeycomb structure 20, the cells 25 includes a plurality of cells A in which one end face 23 side is opened and the other end face 24 has plugged portions 26, and a plurality of cells B in which the other end face 24 side is opened and one end face 23 has the plugged portions 26, the cells B being arranged alternately with the cells A. The number, arrangement, shape, and the like of the cells A and B are not limited, and they can be appropriately designed as needed. Such a honeycomb structure 20 can be used as a filter for purifying particulate matters (carbon fine particles) in an exhaust gas (for example, a gasoline particulate filter (hereinafter, also referred to as "GPF"), or a diesel particulate filter (hereinafter, also referred to as "DPF").

The honeycomb structure 20 according to Embodiment 2 may have a catalyst supported on the surfaces of the porous partition walls 22 that form inner walls of the cells 25 and/or in pores of the partition walls 22. A type of the catalyst is not particularly limited, and it can be appropriately selected according to the use purposes and applications of the honeycomb structure 20. Examples of the catalyst include noble metal catalysts or other catalysts. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a $NO_x$ storage reduction catalyst (LNT catalyst) containing an alkaline earth metal and platinum as storage components for nitrogen oxides ($NO_x$). Illustrative examples of a catalyst that does not use the noble metal include a $NO_x$ selective reduction catalyst (SCR catalyst) containing a copper-substituted or iron-substituted zeolite, and the like. Also, two or more catalysts selected from the group consisting of those catalysts may be used. A method for supporting the catalyst is not particularly limited, and it can be carried out according to a conventional method for supporting the catalyst on the honeycomb structure.

The effects of the wire pieces 28 of the honeycomb structure 20 according to Embodiment 2 of the present invention, and the buffer material 27 or the space provided between the adjacent wire pieces 28 are the same as those of the honeycomb structure 10 according to Embodiment 1 of the present invention as shown in FIG. 3. That is, the electromagnetic induction heating of the honeycomb structure 20 including the cells 25 having such a structure leads to an increase in the temperature and expansion of the plurality of wire pieces 28 made of the magnetic substance. In this case, since each of the buffer materials 27 or spaces is provided between the adjacent wire pieces 28, the buffer materials 27 or spaces absorbs portions extended by the expansion of the wire pieces 28. Therefore, it is possible to satisfactorily suppress the destruction of the plugged portions provided on both end faces 23 and 24 of the cells 25 due to the expansion of the wire pieces 28. Further, as the magnetic substance, the wire pieces 28 having a lower surface area are used in place of magnetic fine particles having a higher surface area. Therefore, the heating by means of electromagnetic induction heating leads to a difficulty to oxidize so that deterioration of heating performance can be satisfactorily suppressed. Furthermore, since the magnetic fine particles have a lower volume, high-frequency induction heating is required for electromagnetic induction heating, which increases the cost for a power source and the like. However, since the wire pieces 28 having a higher volume than that of the magnetic fine particles are used, the cost of the power supply and the like is reduced.

The method for producing the honeycomb structure 20 according to Embodiment 2 of the present invention can be carried out by the same manner as that of the method for producing the honeycomb structure 10 according to Embodiment 1, with the exception that the plugged portions are provided for predetermined cells other than those which are provided with the wire pieces.

<2. Exhaust Gas Purifying Device>

Figure 5:
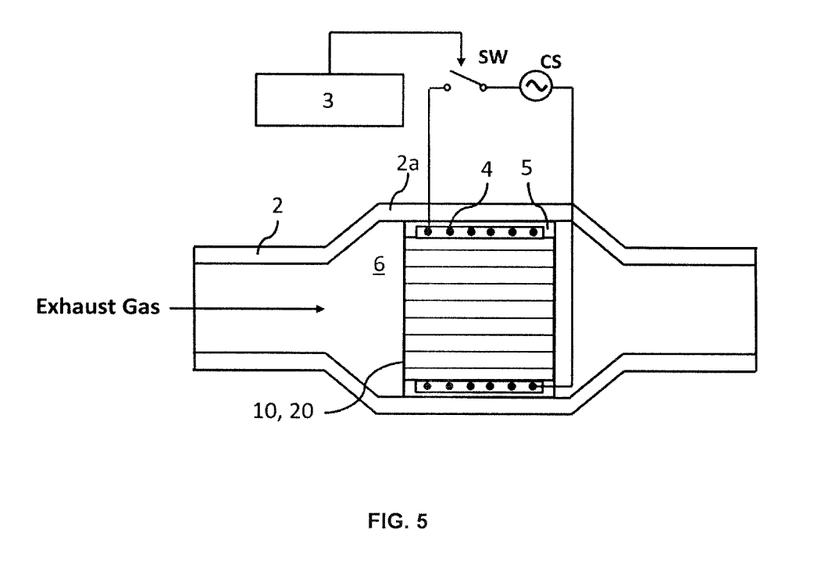
FIG. 5 is a schematic view of an exhaust gas flow path of an exhaust gas purifying device incorporating a honeycomb structure according to Embodiment 1 or 2.

Using the honeycomb structure according to each embodiment of the present invention as described above, an exhaust gas purifying device can be formed. As an example, FIG. 5 shows a schematic view of an exhaust gas flow path of an exhaust gas purifying device 6 including the honeycomb structure 10 or the honeycomb structure 20. The exhaust gas purifying device 6 includes the honeycomb structure 10, 20 and a coil wiring 4 that spirally surrounds the outer circumference of the honeycomb structure 10, 20. Also, the exhaust gas purifying device 6 has a metal pipe 2 for housing the honeycomb structure 10, 20 and the coil wiring 4. The exhaust gas purifying device 6 can be arranged in an increased diameter portion 2a of the metal pipe 2. The coil wiring 4 may be fixed to the interior of the metal pipe 2 by a fixing member 5. The fixing member 5 is preferably a heat-resistant member such as ceramic fibers. The honeycomb structure 10, 20 may support a catalyst.

The coil wiring 4 is spirally wound around the outer circumference of the honeycomb structure 10, 20. It is also assumed that two or more coil wirings 4 are used. An AC current supplied from an AC power supply CS flows through the coil wiring 4 in response to turning on (ON) of a switch SW, and as a result, a magnetic field that periodically changes is generated around the coil wiring 4. The on/off of the switch SW is controlled by a control unit 3. The control unit 3 can turn on the switch SW in synchronization with the start of an engine and pass an alternating current through the coil wiring 4. It is also assumed that the control unit 3 turns on the switch SW regardless of the start of the engine (for example, in response to an operation of a heating switch pushed by a driver).

In the present disclosure, a temperature of the honeycomb structure 10, 20 is increased in response to the change of the magnetic field according to the alternating current flowing through the coil wiring 4. Based on this, carbon fine particles and the like collected by the honeycomb structure 10, 20 are burned out. Also, when the honeycomb structure 10, 20 supports the catalyst, the increase in the temperature of the honeycomb structure 10, 20 raises a temperature of the catalyst supported by the catalyst support contained in the honeycomb structure 10, 20 and promotes the catalytic reaction. Briefly, carbon monoxide (CO), nitrogen oxide ($NO_x$), and hydrocarbon (CH) are oxidized or reduced to carbon dioxide ($CO_2$), nitrogen ($N_2$), and water ($H_2O$).

EXAMPLES

Hereinafter, the present invention will be specifically described based on Examples. However, the present invention is not limited to Examples.

Examples 1 to 7

A rectangular parallelepiped cordierite honeycomb having a length of 11 mm, a width of 19 mm, a height of 25 mm, a thickness of each partition wall of 0.1 mm, and a distance between the partition walls of about 1 mm was provided with wire pieces each having the length shown in Table 1 and made of a magnetic substance in a single cell at intervals of 5×5 cells via buffer materials in the extending direction of the cell. Each buffer material was made of cordierite and silica, and had a length of 1 mm in the extending direction of the cell. Further, the plugged portions were provided at both ends of the cell provided with the wire pieces.

Comparative Examples 1 and 2

The same rectangular parallelepiped cordierite honeycombs as in Example 1 were prepared. Subsequently, a wire having the length shown in Table 1 and made of a magnetic substance was provided in a single cell at intervals of 5×5 cells in the extending direction of the cell. In Comparative Examples 1 and 2, no buffer material was provided, and a single wire was provided in the cell so as to extend from the plugged portion at one end to the plugged portion at the other end.

<Electromagnetic Induction Heating>

Subsequently, a heating test for each of the honeycomb structures according to Examples 1 to 7 and Comparative Examples 1 and 2 was conducted using an electromagnetic induction heating device, and a temperature (Temperature at Induction Heating as shown in Table 1) of the end face of each honeycomb structure was measured with an infrared thermometer. The input power was 4 kW, and the electromagnetic induction heating frequency was 500 kHz.

After increasing the temperature, it was confirmed whether or not cracks were generated in the plugged portions.

<Thermal Expansion Coefficient, Curie Temperature, Porosity, Young's Modulus>

The thermal expansion coefficient of the magnetic substance as shown in Table 1 was the thermal expansion coefficient at 900° C. when 25° C. was used as the reference temperature. The Curie temperature as shown in Table 1 was a temperature at which the ferromagnetic property was lost. The porosity of the buffer materials as shown in Table 1 was measured by image analysis from a SEM image of a cross section of the buffer material. The Young's modulus of the buffer material as shown in Table 1 was measured in accordance with JIS R 1602.

TABLE 1

| | | Substrate | Composition of Magnetic Substance | Thermal Expansion Coefficient ($\times 10^{-6}$/° C.) | Curie Temperature (° C.) | Wire Length of Magnetic Substance (mm) | Buffer Material Material | Length (mm) | Porosity (%) | Young's Modulus (Mpa) |
|---|---|---|---|---|---|---|---|---|---|---|
| Ex. # | 1 | Cordierite | 49CoFe | 11.1 | 950 | 1 | Cordierite, Silica | 1 | 40 | 470 |
| | 2 | | | | | 3 | Cordierite, Silica | 1 | 40 | 470 |
| | 3 | | | | | 5 | Cordierite, Silica | 1 | 40 | 470 |
| | 4 | | | | | 5 | Cordierite, Silica | 1 | 51 | 340 |
| | 5 | | | | | 5 | Cordierite, Silica | 1 | 60 | 240 |
| | 6 | | SUS 430f | 12.4 | 680 | 1 | Cordierite, Silica | 1 | 40 | 470 |
| | 7 | | | | | 3 | Cordierite, Silica | 1 | 40 | 470 |
| Comp. # | 1 | | 49CoFe | 11.1 | 950 | 23 | — | — | — | — |
| | 2 | | SUS 430f | 12.4 | 680 | 23 | — | — | — | — |

| | | Temperature at Induction Heating (° C.) | Temperature Evaluation | Presence or Absence of Cracks in Plugged Portions after Temperature Rise | Overall Evaluation |
|---|---|---|---|---|---|
| Ex. # | 1 | 286 | C | Absent | B |
| | 2 | 523 | B | Absent | A |
| | 3 | 612 | A | Absent | A |
| | 4 | 604 | A | Absent | A |

TABLE 1-continued

|      |   |   | 5 | 610 | A | Absent  | A |
|------|---|---|---|-----|---|---------|---|
|      |   |   | 6 | 250 | C | Absent  | B |
|      |   |   | 7 | 363 | C | Absent  | B |
| Comp. # |   |   | 1 | 612 | A | Present | F |
|      |   |   | 2 | 357 | C | Present | F |

<Evaluation>

The criteria for temperature evaluation in Table 1 are as follows:
- A: 600° C. or more [combustion temperature of soot (derived from diesel)];
- B: 500° C. or more and less than 600° C. [combustion temperature of soot (derived from gasoline)];
- C: 250° C. or more and less than 500° C. [required temperature for automobile exhaust gas purifying catalyst]; and
- D: less than 250° C.

The criteria for the overall evaluation in Table 1 are as follows:
- A: It can be used for GPFs (gasoline particulate filters);
- B: It can be used as a support for automobile exhaust gas purifying catalysts; and
- F: It cannot be used for GPFs and as a support for automobile exhaust gas purifying catalysts.

Since all of the honeycomb structures according to Examples 1 to 7 used the wire pieces having a lower surface area as the magnetic substances, they were difficult to oxidize even if they were heated by electromagnetic induction heating, and had suppressed deterioration of heating performance. Also, after the temperature rise, no crack was generated in the plugged portions.

On the other hand, since each of the honeycomb structures according to Comparative Examples 1 and 2 was provided with no buffer material, and arranged the single wire in the cell so as to extend from the plugged portion at one end to the plugged portion at the other end, cracks were generated in the plugged portions after the temperature rise.

DESCRIPTION OF REFERENCE NUMERALS 10, 20 honeycomb structure
2 metal pipe
3 control unit
4 coil wiring
5 fixing member
6 exhaust gas purifying device
11 outer peripheral wall
12, 22 partition wall
13, 14, 23, 24 end face
15 cell
16, 26 plugged portion
17, 27 buffer material
18, 28 wire piece
25 cells (cell A+cell B)

The invention claimed is:

1. A pillar shaped honeycomb structure, comprising:
an outer peripheral wall; and
porous partition walls disposed on an inner side of the outer peripheral wall, the partition walls defining a plurality of cells, each of the cells extending from one end face to an other end face of the honeycomb structure to form a flow path,
wherein the cells include a plurality of wire pieces comprising a magnetic substance, such that individual cells contain a plurality of wire pieces alternatingly arranged with a plurality of spaces or a plurality of buffer material segments in an extension direction that extends from the one end face of the honeycomb to the other end face of the honeycomb, and
wherein each wire piece within a cell is completely separated from the other wire pieces in the cell by one or more spaces or buffer material segments.

2. The honeycomb structure according to claim 1, wherein each of the wire pieces has a length of 1 to 20 mm in the extending direction of the cells.

3. The honeycomb structure according to claim 1, wherein each of the spaces or the buffer materials has a length of 1 mm or more in the extending direction of the cells.

4. The honeycomb structure according to claim 1, wherein the total length of the spaces or the buffer materials in the extending direction of each cell of the plurality of cells is ⅕ or more of the total length of the wire pieces in the extending direction of each cell of the plurality of cells.

5. The honeycomb structure according to claim 1, wherein the buffer materials have a Young's modulus of 50 to 500 MPa.

6. The honeycomb structure according to claim 1, wherein the buffer materials have a porosity of 40 to 70%.

7. The honeycomb structure according to claim 1, wherein the buffer materials comprise cordierite, silica, or a ceramic material.

8. The honeycomb structure according to claim 1, wherein the wire pieces have a Curie temperature of 600° C. or more.

9. The honeycomb structure according to claim 1, wherein the wire pieces have a thermal expansion coefficient of $8 \times 10^{-6}/°$ C. to $12 \times 10^{-6}/°$ C.

10. The honeycomb structure according to claim 1, wherein the wire pieces comprise a FeCo alloy containing 10% by mass or more of Co or stainless steel.

11. The honeycomb structure according to claim 1, wherein the partition walls and the outer peripheral wall comprise a ceramic material.

12. The honeycomb structure according to claim 11, wherein the ceramic material is at least one selected from cordierite, silicon carbide, aluminum titanate, silicon nitride, mullite, and alumina.

13. The honeycomb structure according to claim 1, wherein the cells comprise:
a plurality of cells A which are opened on the one end face side and have plugged portions on the other end face; and
a plurality of cells B which are arranged alternately with the cells A, and which are opened on the other end face side and have plugged portions on the one end face.

14. An exhaust gas purifying device, comprising:
the honeycomb structure according to claim 1;
a coil wiring that spirally surrounds an outer circumference of the honeycomb structure; and
a metal pipe for housing the honeycomb structure and the coil wiring.

* * * * *